Sept. 29, 1970  B. MAGNUSSON ETAL  3,531,275
USE OF SILICIDE ELECTRODE IN GLASS MELTING
Filed Oct. 25, 1968   2 Sheets-Sheet 1

BENGT MAGNUSSON and
VENANZIO BIZZARRI, Inventors

By Wadsworth, Lind & Ponack,
Attorneys

Sept. 29, 1970  B. MAGNUSSON ETAL  3,531,275
USE OF SILICIDE ELECTRODE IN GLASS MELTING
Filed Oct. 25, 1968  2 Sheets-Sheet 2
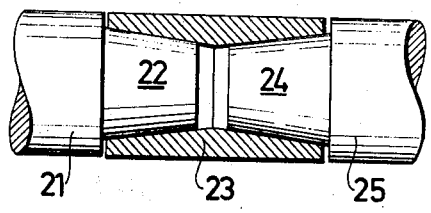
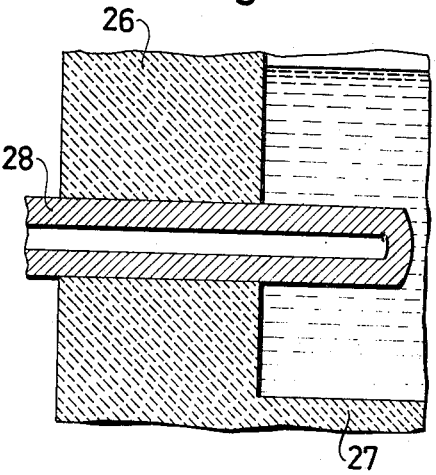
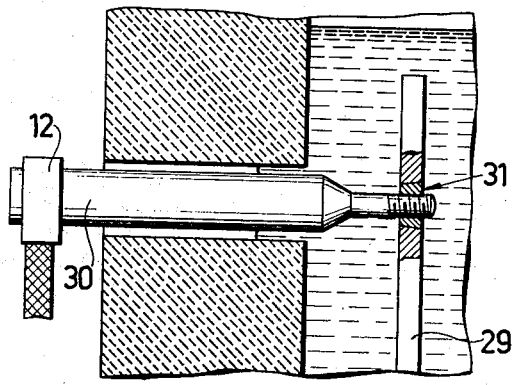
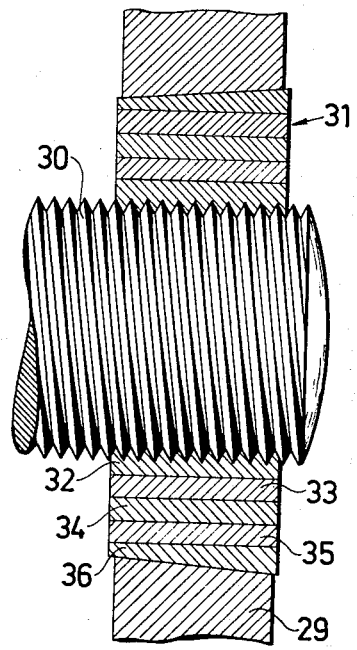
BENGT MAGNUSSON and
VENANZIO BIZZARRI, Inventors
By Wendwath, Lind & Ponack
Attorneys 3,531,275
USE OF SILICIDE ELECTRODE IN GLASS MELTING Bengt Magnusson and Venanzio Bizzarri, Hallstahammar, Sweden, assignors to Aktiebolaget Kanthal, Hallstahammar, Sweden
Continuation-in-part of application Ser. No. 505,270, Oct. 26, 1965. This application Oct. 25, 1968, Ser. No. 770,778
Int. Cl. C03b 5/16
U.S. Cl. 65—134      4 Claims

ABSTRACT OF THE DISCLOSURE

Electrode, agitator, pyrometer-protecting tube and the like bodies, intended for use in contact with molten glass, is made at least as far as those portions which come into contact with the glass of a composition consisting of about 90% by weight of molybdenum silicide or tungsten silicide, the remainder being constituted by vitreous oxide.

---

Figure 1:
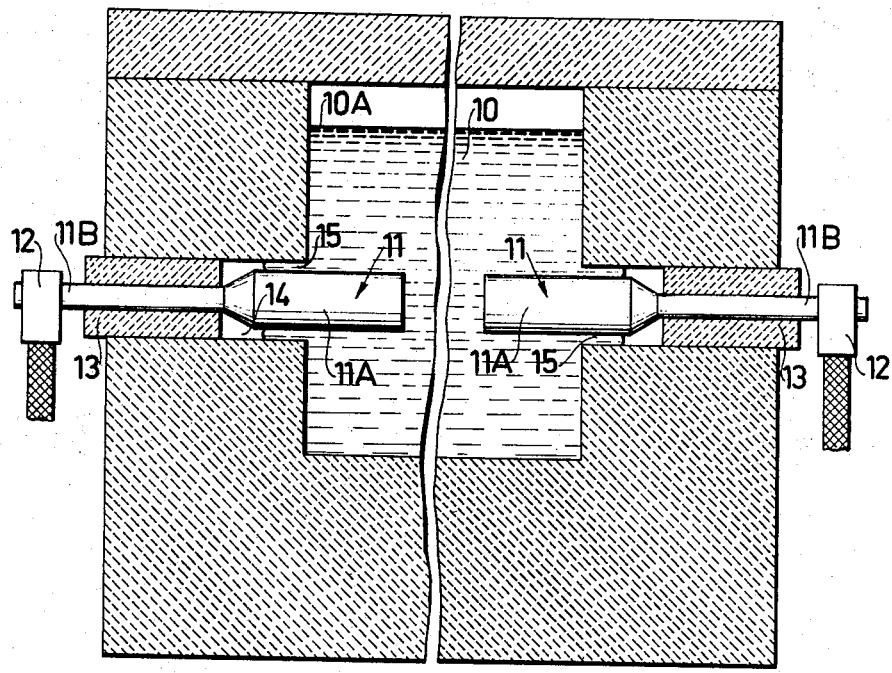

This invention relates to a body intended for use in molten glass and is a continuation in part of the invention as disclossed in our patent application Ser. No. 505,270, filed Oct. 26, 1965 now abandoned.

An object of the invention is to provide an electrode body for the direct heating of glass, for example, in feeders and tank furnaces or for the heating and melting of glass generally, although the invention is not restricted to such applications only.

The use of electrodes for the direct heating of glass has already been suggested. Considerable advantages are gained by this method compared with heating by means of gas or oil and even compared with indirect heating by means of resistance elements. In simpler applications, iron has been used as the electrode material but this has had the disadvantage of discoloring the molten glass to an inadmissible extent. The use of molybdenum electrodes has also been suggested, but these are very expensive in particular because they require a complicated lead-through arrangement for protecting against oxidation, so that the installation costs are high.

An object of the invention is to avoid the above mentioned disadvantages, and the body, or at any rate at least one part of it which comes into contact with the molten glass during use is characterized in the broadest aspect of the invention that it principally consists of a substantially porefree solid composition consisting of a relatively major proportion of a silicide of the group comprising molybdenum and tungsten and a relatively minor proportion of a vitreous oxide component.

Figure 2:
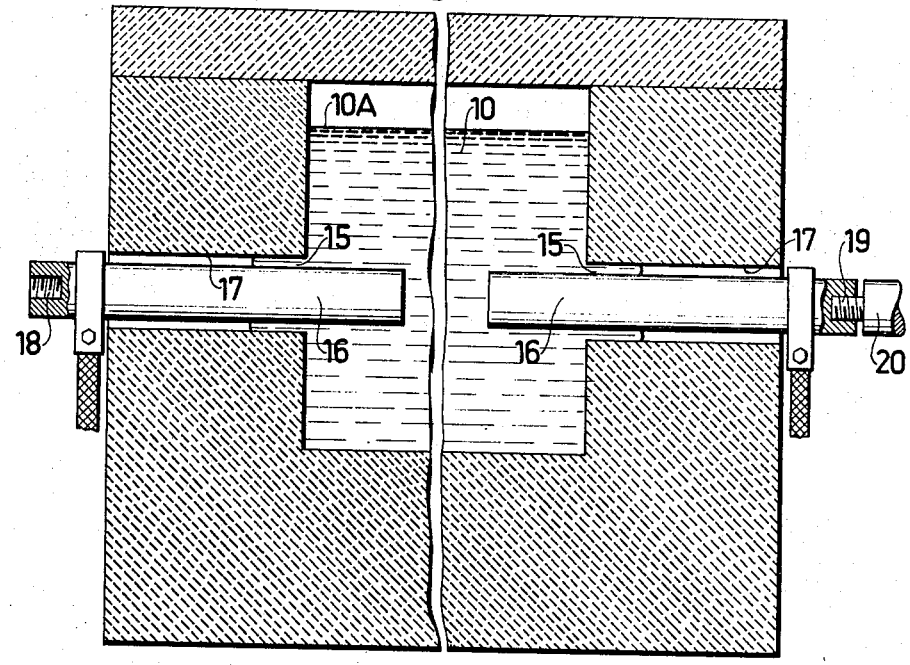

With the above and other objects in view which will appear from the detailed description given below, some preferred modifications of the invention are shown in the drawings, in which:

FIG. 1 is a cross-sectional view of a glass feeder and
FIG. 2 is a similar view showing a modification;
FIG. 3 shows an electrode joint, partly in axial section;
FIG. 4 shows a polymeter-protecting tube installed in a glass feeder;
FIG. 5 shows an electrode-terminal arrangement;
FIG. 6 shows a detail of FIG. 5, drawn to a larger scale.

FIG. 1 shows a feeder for the glass 10 wherein the two opposing side walls are provided with electrodes 11 for the direct heating of the glass.

Each of the electrodes 11 is arranged at a sufficient distance below the surface 10A of the glass to avoid any possibility of atmospheric oxygen reaching the electrodes, which are heated to a high temperature during operation. This distance varies with different conditions but is at least about ½″ and preferably not less than 2″, below the upper surface of the glass.

The electroes 11 consist of rods with a random cross-sectional area. In the example shown the electrodes consist of rods having a circular cross-section having a thicker end 11A and a narrower lead-in part 11B on which the terminal lead-in 12 is clamped. A sleeve 13 of ceramic material is pushed over the part 11B for guiding and heat insulation purposes.

FIG. 2 is similar to FIG. 1, but the electrodes are of a slightly modified type. The electrodes 16 have a uniform thickness throughout their entire length and are each fitted in cylindrical clearing holes 17 in the furnace walls. The electrodes 16 are provided with tapped holes 18 and 19 by means of which a new electrode can without interruption be screwed onto the end of a partially used-up one and fed into the furnace as indicated by electrode 20 in FIG. 2.

Another method of joining a new electrode to the end portion of an electrode which has been partially consumed is illustrated in FIG. 3. In this case, the end portion of the left-hand electrode 21 which is the one in operation and consumed at least partially has been initially machined into a frusto-conical tip 22. Then, on performing the joint a sleeve 23 having outwardly opening frusto-conical machined bores in each end has been pushed on to the tip 22 of the electrode 21, and finally the machined frusto-conical tip 24 at the end of a fresh electrode 25 has been entered into the sleeve 23. Preferably, the outer diameter of the sleeve 23 should correspond to those of the electrodes 21 and 25. Also, the angle of taper of the frusto-conical tips 22, 24 and the internal bore of the sleeve 23 should be comparatively small so as to afford a self locking action as the fresh electrode 25 is joined to the electrode 21 by hammering it lightly axially in position. The sleeve 23 may consist of the electrode material or any other suitable heat resistant material. Also molybdenum may be used, which must be protected against oxidation.

To return now to FIGS. 1 and 2 it will be noted that each of the electrodes is loosely held in the openings 14 and 17, which have a slightly larger diameter than the external diameter of the ends of the electrodes 11A and 16. This means that the molten glass will be forced slightly outwardly between the ends of the electrodes 11A and 16 and the inside of the openings 14 and 17 as shown at 15, and will gradually solidify, thereby providing self-sealing. By utilizing this self-sealing action the electrodes can be replaced during operation and can, of course, also be pushed in or pulled out slightly and turned if necessary.

An electrode found to be particularly suitable, has the following composition: (1) about 90% by weight of a component A consisting of about 90% by weight of molybdenum disilicide ($MoSi_2$) and 10% by weight of $Mo_5Si_3$, and (2) about 10% by weight of a vitreous oxide component B consisting of about 90% by weight $SiO_2$, the remainder being constituted principally by $Al_2O_3$, with traces of $Fe_2O_3$, CaO, $MoO_3$, $Na_2O$, and $K_2O$. According to the invention it is advisable to add to the composition as component C about 5% by weight of clay of the montmorillonite group, preferably bentonite, in order to facilitate the production of pore-free bodies.

The diameter of the electrode is preferably 25 mm. and when operating in a soda-lime glass, the temperature of which was 1350° C., a current was passed through the electrode representing 3 A. per sq. cm. of that part of the electrode which was in contact with the molten glass. The electrode should have a low porosity. Experiments have shown that the rate of decomposition in the glass falls with lower porosity and in practice a porosity of less than 1.5% is suitable, although better results are obtained with a porosity below 0.5%. Low porosity also has a favorable effect on those parts of the electrode which are exposed to atmospheric air temperatures within the range 300–800° C., since low-temperature oxidation ("pest") is less severe with reduced porosity.

There is also the possibility of manufacturing the electrodes in several parts in such a way that only the immersed parts consist of material composed as described above, while the outer parts which do not come into contact with the hot molten glass, and which are not subjected to extremely high temperatures, consist of other more conventional materials. The electrodes could be applied as protection tubes on rods of material other than that proposed. Also other combinations would be possible as will be disclosed in more details further below.

The bodies envisaged in this invention are characterized not only by resistance to attack by the glass at high temperatures but also by resistance to oxidation in atmospheric air at all temperatures up to 1700° C. They do not, therefore, need any special cooling at those parts which are subjected to the action of atmospheric air as is the case with molybdenum metal, for example.

In FIG. 4 there is shown a portion of a glass feeder having a side-wall 26 and a bottom 27. Through the side-wall 26 there is inserted a pyrometer-protecting tube 28 the inner end of which is closed whereas the outer end is open to permit temperature measuring by means of a pyrometer. Naturally, the tube 28 may also be used as a protecting tube for a thermo-element.

To turn now to FIGS. 5 and 6 there is shown therein a portion of a glass feeder wherein a comparatively big electrode plate 29 is arranged for direct heating of the glass melt in cooperation with one or more similar electrodes (not shown). In this case the electrode plate 29 consists of molybdenum metal which has excellent properties to be used for the electrode plate proper. However, molybdenum metal is not resistant to oxidation in air at elevated temperatures. Therefore, the lead-in electrode or terminal portion of the electrode assembly in FIG. 5 is constituted by a terminal or electrode rod 30 of the material according to the invention, e.g. of a relatively major proportion of molybdenum or tungsten silicide and a relatively minor proportion of vitreous oxide. The electrode rod 30 may be connected to the electrode plate 29 in any convenient way, ensuring a perfect contact also at very elevated temperatures.

One suitable way of joining the electrode plate 29 to the electrode rod is shown in FIGS. 5 and 6. In this case the electrode rod 30 is provided with a thread on the innermost end thereof which is screwed into a bushing generally denoted 31. The bushing may be conical and pressed into a conical hole in the electrode plate 29, but it may also be cylindrical and inserted into a cylindrical bore in the plate. The bushing is composed of a plurality of layers, in this case five layers 32, 33, 34, 35, 36 of stepwise varying composition in such a manner that the layer adjacent the molybdenum metal plate 29 is composed wholly or nearly wholly of molybdenum metal whereas the layer adjacent the electrode rod 30 is composed of wholly or nearly wholly of the same material as that of the rod 30. The layers may be made by metal-spraying, such as by the so called plasma spraying method. Also, it has been contemplated to spray the layers one upon the other starting with the first layer directly on the electrode rod, in which case the outer thread for threaded connection with the plate would have to be made on the outermost layer, such as the layer 36.

The invention has been described with particular reference to electrode bodies, but, as mentioned, is not confined to this application only, since the same considerations also apply, for example, to pyrometer-protecting tubes, agitators, etc. It is therefore apparent that the possibility exists for a wide variety of modifications and detailed alterations within the general conception of this invention.

What is claimed is:

1. A method for the direct heating and melting of glass which comprises bringing into contact with said glass an electrode consisting essentially of a substantially nonporous solid composition consisting of a silicide of the group comprising molybdenum and tungsten and a vitreous oxide component, passing an electric current through said electrode, and maintaining said electrode completely below the surface of the glass whereby said electrode is completely insulated from contact with atmospheric oxygen.

2. A method as in claim 1, wherein said composition consists of 80–95% by weight of said silicide and 5–20% by weight of said vitreous oxide component, and wherein said vitreous oxide component consists of $SiO_2$ and $Al_2O_3$.

3. In a method as in claim 2, wherein said vitreous oxide component consists of about 80–95% by weight of $SiO_2$ and about 5–20% by weight of $Al_2O_3$.

4. A method as claimed in claim 1, wherein said composition comprises (1) approximately 90% by weight of a component A consisting of 90% by weight of molybdenum disilicide ($MoSi_2$) and 10% by weight of $Mo_5Si_3$, and (2) approximately 10% by weight of a vitreous oxide component B consisting of about 80–95% by weight of $SiO_2$, the remainder being constituted principally by $Al_2O_3$, with traces of $Fe_2O_3$, CaO, $MoO_3$, MgO, $Na_2O$ and $K_2O$.

References Cited

UNITED STATES PATENTS

| | | | |
|---|---|---|---|
| 2,330,343 | 9/1943 | Frantz | 65—178 |
| 2,622,304 | 12/1952 | Cuffer | 25—156 |
| 2,891,914 | 6/1959 | Fenity | 252—518 |
| 3,027,330 | 5/1962 | Schrewelius | 252—518 |
| 3,388,204 | 6/1968 | Ellis | 13—18 |
| 3,391,237 | 7/1968 | Penberthy | 13—6 |
| 2,921,106 | 1/1960 | Arbeit | 65—136 |
| 3,412,194 | 11/1968 | Strohmeier et al. | 13—6 |

FRANK W. MIGA, Primary Examiner

U.S. Cl. X.R.

13—6, 18; 65—136, 337; 219—145, 146